United States Patent [19]
Kuwata

[11] Patent Number: 5,984,707
[45] Date of Patent: Nov. 16, 1999

[54] ELECTRICAL CONNECTOR FOR CARD HAVING SURFACE CONTACT POINT

[75] Inventor: Tomonari Kuwata, Tokyo, Japan

[73] Assignee: Hirose Electric Co., Ltd., Tokyo, Japan

[21] Appl. No.: 09/053,663

[22] Filed: Apr. 2, 1998

[30] Foreign Application Priority Data

Apr. 10, 1997 [JP] Japan .................................... 9-106853

[51] Int. Cl.$^6$ .............................................. H01R 13/62
[52] U.S. Cl. ............................................................ 439/326
[58] Field of Search .................................... 439/326, 331, 439/341, 376, 630

[56] References Cited

U.S. PATENT DOCUMENTS 5,504,435 4/1996 Perego ..................................... 439/331
5,813,878 12/1996 Kuwata .................................... 439/326

FOREIGN PATENT DOCUMENTS 5-502959 5/1993 Japan .

*Primary Examiner*—Neil Abrams
*Assistant Examiner*—Javaid Nasri
*Attorney, Agent, or Firm*—Kanesaka & Takeuchi

[57] ABSTRACT

A movable member 12 is attached to the frame 3 so as to move between a release position and a lock position. A first latch projection 14 is provided on the movable member. A lock arm 7 extends upwardly from the base beyond the first latch projection at the lock position. A second latch projection extends downwardly from the lock arm toward the base at a position between the first latch projection at the lock position and the end of the base by a distance (b) defined by a following inequality:

$$a<b<a+c$$

wherein (a) is a thickness of the movable member at the first latch projection and (c) is a maximum amount of deformation of the contact portion of the contact element made by the card pressed.

1 Claim, 2 Drawing Sheets

ELECTRICAL CONNECTOR FOR CARD HAVING SURFACE CONTACT POINT

BACKGROUND OF THE INVENTION

1. Filed of the Invention

The present invention relates to an electrical connector for a card having a surface contact point.

2. Description of the Related Art

To expand or specialize the functions of an electronic device, a card having a surface contact point for a special circuit is inserted into the electronic device.

For example, a subscriber identity module (SIM) card is inserted in a mobile telephone to specialize the telephone for the owner. Consequently, anyone having a SIM card can use the telephone set as his or her personal telephone.

By removing the cover of a mobile telephone set, access can be made to a SIM card socket connector so that it is easy to replace the SIM card. The connector comprises a base made of an insulative material, a plurality of contact elements supported by the base, and a frame rotatably supported by the base. A SIM card is inserted into the frame and the frame is closed onto the base such that the SIM card is brought into contact with the resilient contact elements. The frame is locked to the base. As Japanese patent application Kokai No. 502059/93 shows, the frame is moved along the base by a predetermined distance so that their flexible latch portions snap each other for making lock. Then, the cover is attached and the mobile telephone functions as a dedicated device for the SIM card owner.

However, the above latch portions of the frame and the base receive large forces for elastic deformation so that they wear after a period of use and fail to lock.

SUMMARY OF THE INVENTION

Accordingly, it is an object of the invention to provide an electrical connector for a card, which has a long service life without wearing of the latch portions.

According to the invention there is provided an electrical connector which comprises a base made of an insulative material to provide a card mounting surface; a resilient contact element having a contact portion projecting from the card mounting surface; a frame having an end attached to the base for rotation between an open position where the card is received therein and a closed position where the circuit trace of the card is brought into contact with the resilient contact element for electrical connection.

According to the invention, a movable member is attached to the frame so as to be movable between a release position and a lock position. A first latch projection is provided on the movable member. A lock arm extending upwardly from the base beyond the first latch projection at the lock position. A second latch projection extends downwardly from the lock arm toward the base at a position between the first latch projection at the lock position and the end of the base by a distance (b) defined by a following inequality:

$$a < b < a + c$$

wherein (a) is a thickness of the movable member at the first latch projection and (c) is a maximum amount of deformation of the contact portion of the contact element made by the card pressed.

In operation, the frame is opened and the card is placed at a predetermined position, and the frame is rotated to the closed position. Upon depression, the card flexes the resilient contact element and contacts with the card mounting surface of the base. Then, the movable member is moved to the lock position.

Since the thickness (a) of the movable member at the position of the first latch projection is smaller than the distance (b) between the second latch projection and the card mounting surface of the base, the first latch projection passes to the lock position without any interference with the second latch projection.

When the finger is removed from the movable member, the resilient contact element returns to the original position, moving the first latch projection upwardly. Since $b < a + c$ at the lock position, the first latch projection engages the second latch projection so that the movable member is under the lock condition and cannot be returned to the release position.

To release the lock, the movable member is pressed and slid to the release position while the first and second latch projections do not contact each other.

DESCRIPTION OF THE PREFERRED EMBODIMENT

Embodiments of the invention will now be described with reference to the accompanying drawings FIGS. 1 and 2.

Figure 1:
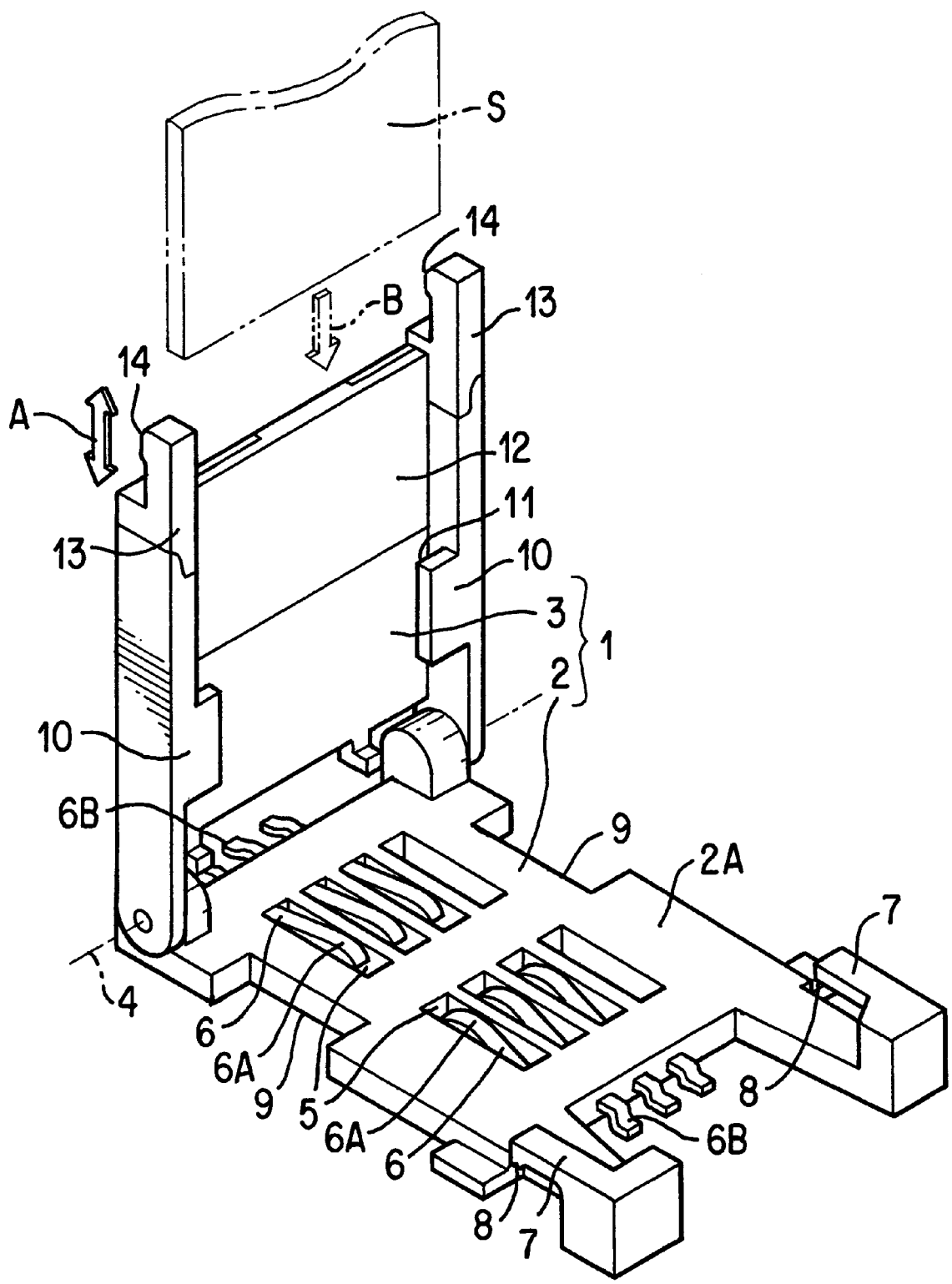
FIG. 1 is a perspective view of an electrical connector according to an embodiment of the invention, wherein the frame is opened.

In FIG. 1, a card connector 1 comprises a base 2 and a frame 3 both made of an insulative material. The frame is rotatable about an axis 4.

A plurality of parallel slots 5 are provided in the base 2 such that the convex contact portions 6A of contact elements 6 which are made of a resilient metal and supported by the base are projected above a card mounting surface 2A of the base 2. The connection portions 6B of the contact elements 6 are bent downwardly so that when the base is mounted on a circuit board, they are brought into contact with the circuit traces of a circuit board for soldering.

A pair of lock arms 7 extend upwardly and then rearwardly toward the axis 4 from the front end of the base. A latch projection 8 extends downwardly from the end of a lock arm 7 up to a predetermined distance from the upper surface of the base 2.

A pair of cutouts 9 are provided on opposite sides of the base to receive a portion of the frame.

A pair of protruded pieces 10 are provided on opposite sides of the frame 3 to form a receiving slot 11 so that a surface contact card, such as a SIM card, is inserted into the receiving slot from above such that the circuit portion of the SIM card S is opposed to the base 2.

A movable member 12 is attached to the frame 3 so that it is movable in back-and-forward directions A. A pair of extensions 13 are provided on the movable member 12. A pair of latch projections 14 are provided on the extensions 13 on the side opposite to the base 2.

The positions and sizes of the latch projections 8 and 14 and the contact portions 6A of the contact elements 6 will be described with respect to FIGS. 2A–2C, wherein in FIG. 2A, the frame is not pressed by the finger, in FIG. 2B, the frame is pressed by the finger but the latch projections are not engaged, and in FIG. 2c, the frame is latched and the pressure by the finger is released.

Figure 2A:
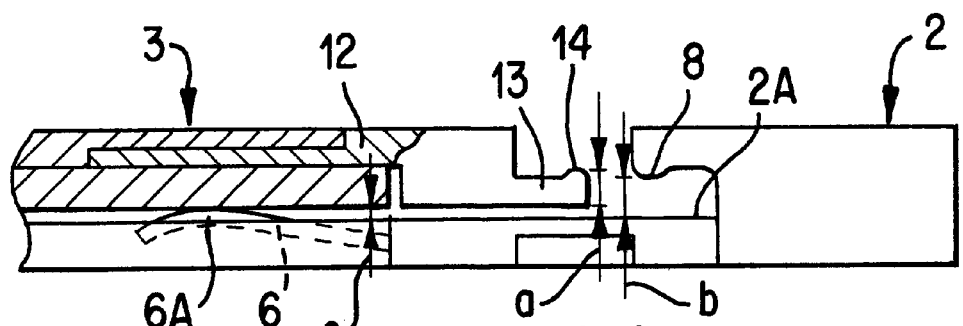
FIG. 2A is a partially sectional side view of the electrical connector, wherein the movable member is not pressed by the finger.

In FIG. 2A, the distance (b) between the mounting surface 2A of the base 2 and the latch projection 8 is larger than the thickness (a) of the extension 13 at the position of the latch projection 14. However, the distance (b) is smaller than the sum of the thickness (a) and the amount of projection (c) of the contact portion 6A from the mounting surface 2A.

How to use the connector will be described.

(1) First of all, as shown in FIG. 1, the SIM card S is inserted into the receiving slot 11 of the frame 3 in the direction of an arrow B.

(2) The frame is then rotated downward in FIG. 1 to the closed position as shown in FIG. 2A so that the contact portions 6A of the contact elements 6 support the SIM card S above the mounting surface 2A of the base 2.

Figure 2B:
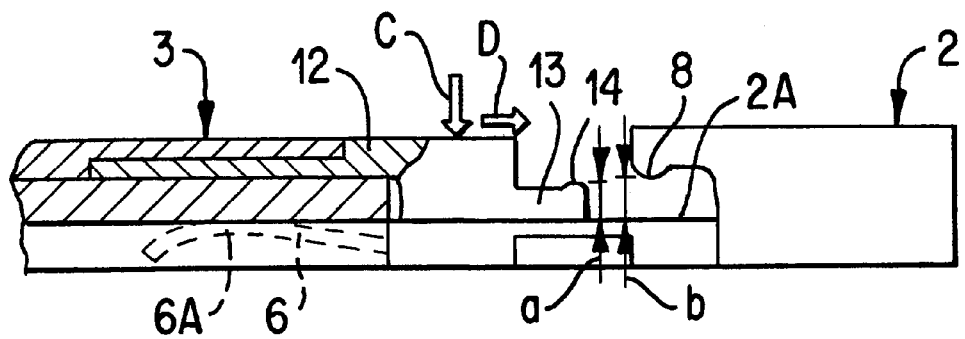
FIG. 2B is a partially sectional side view of the electrical connector, wherein the movable member is pressed by the finger.
Figure 2C:
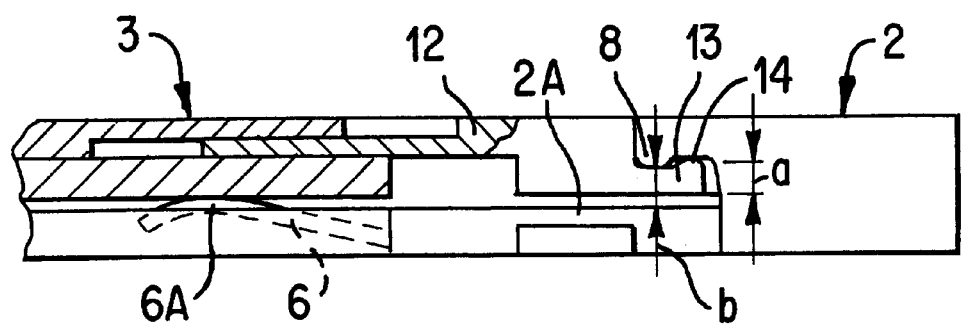
FIG. 2C is a partially sectional side view of the electrical connector, wherein the movable member is brought into the lock position and the finger pressure is removed.

(3) The movable member 12 is pressed by the finger in the direction of an arrow C as shown in FIG. 2B so that the card S rests on the mounting surface 2A against the contact portions 6A of the contact elements 6.

(4) Then, the movable member 12 is moved in the direction of an arrow D as shown in FIG. 2B. Since the distance (b) is larger than the distance (a), the latch projections 14 of the movable member 12 pass the latch projections 8 of the base 2 without any interference with the projections 8.

(5) Then, the finger is removed to release the pressure on the movable member 12 so that the movable member 12 is pushed upwardly by the resilient contact elements 6 via the card S. Consequently, the latch portions 8 and 14 engage each other to lock the frame 3.

(6) To release the lock of the frame 3 and replace the card S, the order of operations (1)–(5) is reversed. That is, the movable member 12 is pressed by the finger to release the lock and moved backwardly (to the left in FIG. 2C) so that the frame 3 is rotated upwardly for replacement of the card S.

The present invention is not limited to the illustrated embodiment. For example, the movable member may be made to form a part of the frame. Moreover, the frame itself may be made movable. In this case, the holes for supporting the rotation shaft are made elongated so that the frame can be moved to the lock position after rotation to the closed position.

In addition, the movable member may be made movable in parallel to the axis of rotation of the frame.

According to the invention, the movable member is pressed and moved forwardly to lock the frame so that the latch portions of the base do not interfere with the latch portions of the frame, preventing wear of the latch portions. When the finger is removed, the latch portions of the frame and the base engage each other to make a firm lock. Thus, the user-friendly lock of a long service life is provided.

What is claimed is:

1. An electrical connector for a card having a circuit trace on a surface thereof, comprising:

a base made of an insulative material to provide a card mounting surface;

a resilient contact element having a contact portion projecting from said card mounting surface;

a frame having an end attached to said base for rotation between an open position where said card is received therein and a closed position where said circuit trace is brought into contact with said resilient contact element for electrical connection;

a movable member attached to said frame so as to be movable between a released position and a lock position;

an extended arm provided on said movable member;

a first latch projection extending upwardly from said extended arm;

a lock arm extending upwardly from said base beyond said first latch projection at said lock position; and a second latch projection extending downwardly from said lock arm toward said base by a distance (b) defined by a following inequality:

$$a<b<a+c$$

wherein (a) is a thickness of said movable member at said first latch projection and (c) is a maximum amount of deformation of said contact portion of said contact element made by said card pressed, wherein a central portion of said movable member is inserted into a cut portion provided on a back side of said frame, and a side wall of a front portion of said movable member has a thickness substantially equal to that of a side wall of said frame and projects from an end of said frame, thereby minimizing a height of said connector.

* * * * *